(12) United States Patent
Kezys et al.

(10) Patent No.: US 8,437,324 B2
(45) Date of Patent: *May 7, 2013

(54) PROVISIONING METHODS AND APPARATUS FOR WIRELESS LOCAL AREA NETWORKS (WLANS) WITH USE OF A PROVISIONING ESSID

(75) Inventors: Vytautas Robertas Kezys, Hamilton (CA); Thomas Charles Nagy, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 3 days.

This patent is subject to a terminal disclaimer.

(21) Appl. No.: 13/231,593

(22) Filed: Sep. 13, 2011

(65) Prior Publication Data

US 2012/0233672 A1    Sep. 13, 2012

Related U.S. Application Data

(63) Continuation of application No. 11/611,293, filed on Dec. 15, 2006, now Pat. No. 8,032,174, which is a continuation-in-part of application No. 11/482,864, filed on Jul. 7, 2006, now Pat. No. 7,831,236.

(51) Int. Cl.
*H04W 4/00* (2009.01)
(52) U.S. Cl.
USPC ........ 370/338; 370/328; 455/552.1; 455/455; 455/436; 455/447
(58) Field of Classification Search .................. 370/338, 370/328; 455/452.1, 432, 455, 436
See application file for complete search history.

(56) References Cited

U.S. PATENT DOCUMENTS

| 7,133,670 | B1 | 11/2006 | Moll et al. |
| 7,277,547 | B1 | 10/2007 | Delker et al. |
| 2004/0023640 | A1 | 2/2004 | Ballai |
| 2004/0090972 | A1 | 5/2004 | Barrett et al. |
| 2004/0176024 | A1* | 9/2004 | Hsu et al. ..................... 455/3.04 |

(Continued)

FOREIGN PATENT DOCUMENTS

JP    2003101553    9/2004

OTHER PUBLICATIONS

Office Action for U.S. Appl. No. 11/482,864, Feb. 22, 2010.
Office Action for U.S. Appl. No. 11/611,274, Aug. 6, 2009.

(Continued)

*Primary Examiner* — Kamran Afshar
*Assistant Examiner* — Manpreet Matharu
(74) *Attorney, Agent, or Firm* — John J. Oskorep, Esq.

(57) ABSTRACT

A wireless network has a primary network which provides one or more communication services and a provisioning network which provides a provisioning service but disallows the one or more communication services. A mobile device associates with an access point of the wireless network by sending a request which includes a first set service identifier (SSID) for accessing and operating in the provisioning network. If an authentication procedure is successful, the device receives via the access point a second SSID in a provisioning procedure with the provisioning network, and programs the second SSID in a network list. The device subsequently associates with the access point by sending a request which includes the second SSID from the network list instead of the first SSID, for accessing and operating in the primary network for the one or more communication services.

20 Claims, 5 Drawing Sheets

U.S. PATENT DOCUMENTS

| | | |
|---|---|---|
| 2004/0185845 A1 | 9/2004 | Abhishek et al. |
| 2004/0248557 A1* | 12/2004 | Muratsu ........................ 455/411 |
| 2005/0180367 A1* | 8/2005 | Dooley et al. ................. 370/338 |
| 2005/0245235 A1 | 11/2005 | Vesuna |
| 2005/0288021 A1 | 12/2005 | Hunkeler |
| 2006/0223536 A1 | 10/2006 | Chia |
| 2007/0147318 A1 | 6/2007 | Ross et al. |

OTHER PUBLICATIONS

Summons to Oral Proceedings for EPO Patent Application # 06126276.2, Aug. 10, 2009.

European Search for EPO patent application # 06126276.2, Feb. 5, 2007.

* cited by examiner

PROVISIONING METHODS AND APPARATUS FOR WIRELESS LOCAL AREA NETWORKS (WLANS) WITH USE OF A PROVISIONING ESSID

CROSS-REFERENCE TO RELATED APPLICATIONS

This patent application is a continuation of and claims priority to a U.S. non-provisional patent application having application Ser. No. 11/611,293 and filing date of 15 Dec. 2006, now U.S. Pat. No. 8,032,174, which claims priority to U.S. non-provisional patent application having application Ser. No. 11/482,864 and filing date of 7 Jul. 2006, now U.S. Pat. No. 7,831,236 each application being hereby incorporated by reference herein.

BACKGROUND

1. Field of the Technology

The present application relates to provisioning extended service set identifiers (ESSIDs) of mobile communication devices which operate in wireless local area networks (WLANs).

2. Description of the Related Art

In wireless communication networks, such as wireless local area networks (WLANs) which operate in accordance with 802.11-based standards, one or more network identifiers may be utilized by mobile communication devices to identify the appropriate WLAN to connect with and obtain services. One of these services may be a voice telephony service, such as the voice telephony service based on Voice over IP (VoIP) communications via the WLAN. For 802.11-based WLANs, the network identifiers are called extended service set identifiers (ESSIDs).

After a mobile device is manufactured and sold, the ESSID of the WLAN for the mobile device needs to be programmed or saved in memory of the mobile device. This type of programming is typically referred to as provisioning. Typically, the ESSID is entered in by the end user through a keyboard of the mobile device. It is desirable, however, to minimize data entry steps for provisioning a mobile device. It would be desirable to have the WLAN itself provision the mobile device with the ESSID, but the mobile device needs the ESSID of the WLAN in order to initially connect with its WLAN.

BRIEF DESCRIPTION OF THE DRAWINGS

Embodiments of present invention will now be described by way of example with reference to attached figures, wherein.

DETAILED DESCRIPTION OF THE PREFERRED EMBODIMENTS

Methods and apparatus for use in provisioning mobile communication devices in wireless local area networks (WLANs) are described. In one illustrative example, a mobile communication device associates with a wireless access point of a provisioning virtual local area network (VLAN) of the network with use of a provisioning network identifier ("provisioning ESSID"). After associating with the wireless access point with the provisioning network identifier, a primary network identifier ("primary ESSID") associated with a primary VLAN of the network is received from the WLAN in a provisioning procedure and stored in memory of the mobile device after authentication. For subsequent communications with the WLAN, the mobile device associates with a wireless access point of the primary VLAN of the network with use of the primary network identifier.

Figure 1:
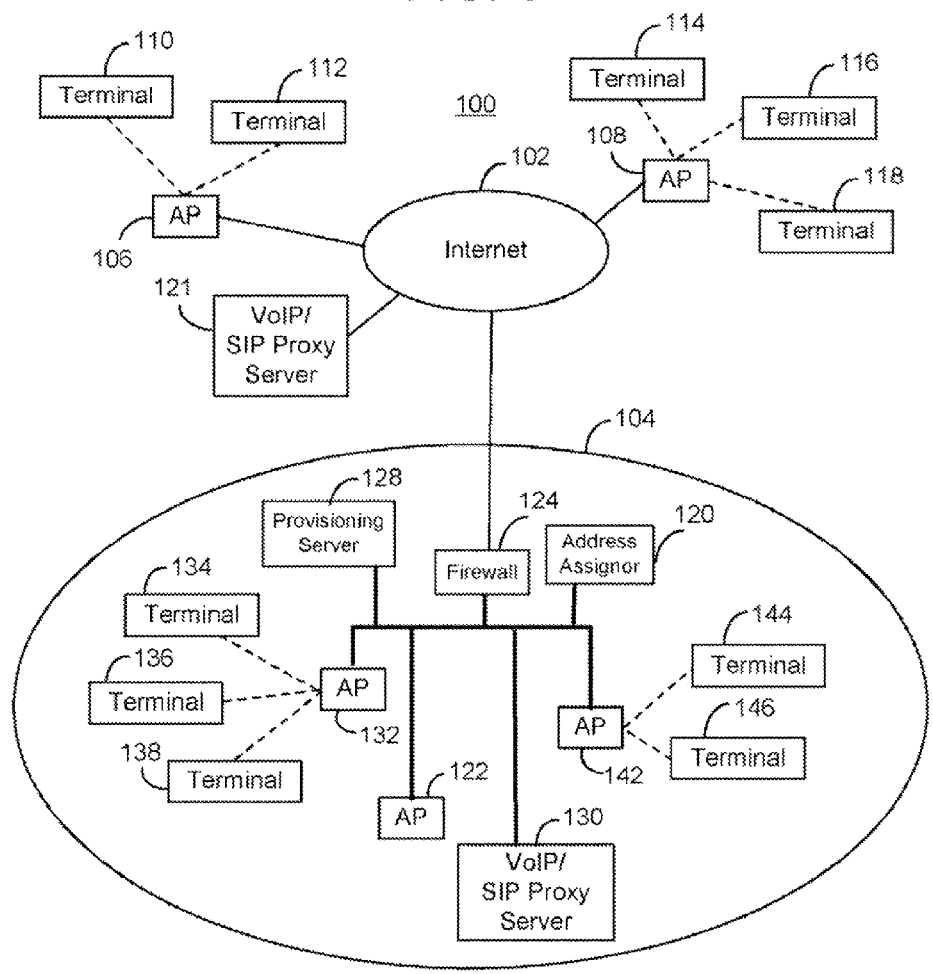
FIG. 1 is a block diagram which illustrates a communication system which includes a communication network having a wireless local area network (WLAN)

FIG. 1 is a block diagram which illustrates a communication system 100 which includes a public network 102 (e.g. the Internet) and a private network 104. In the present embodiment, private network 104 is or includes a wireless local area network (WLAN). In the WLAN, terminals may connect to their associated networks through access points (APs) as shown. Preferably, at least some of the APs are wireless APs of the WLAN and at least some of the terminals are mobile/wireless communication devices which interface and connect through these wireless APs. Such terminals and APs may operate in accordance with well-known IEEE 802.11 standards. The terminals shown in public network 102 include terminals 110 and 112 which have interfaced with AP 106, and terminals 114, 116, and 118 which have interfaced with AP 108. The terminals shown in private network 104 include terminals 134, 136, 138 which have interfaced with AP 132, and terminals 144 and 146 which have interfaced with AP 142.

Private network 104 which includes the WLAN provides various data and communication services to its terminals. For example, private network 104 may provide for voice telephony communication services for its terminals with use of Voice over IP (VoIP) communications. For these types of services, private network 104 may utilize a VoIP server architecture for VoIP communication sessions, and/or an e-mail server architecture for e-mail message communications, as examples. For these purposes, communication system 100 may also include at least one VoIP or Session Initiation Protocol (SIP) proxy server. In the present embodiment, communication system 100 has a VoIP or SIP proxy server 121 in public network 102 and a VoIP or SIP proxy server 130 in private network 104. Note that some communication applications utilized by terminals, such VoIP applications, require the use of SIP. SIP is well-documented in standard documents such as Request For Comments (RFC) 3261. A firewall 124 may also be provided in private network 104 for preventing unauthorized access from users in public network 102. Private network 104 also has a provisioning server 128 which assists in performing wireless network provisioning procedures with terminals for their receipt and programming of enterprise-specific ESSIDs, which is described in more detail below in relation to FIGS. 3-4.

Figure 2:
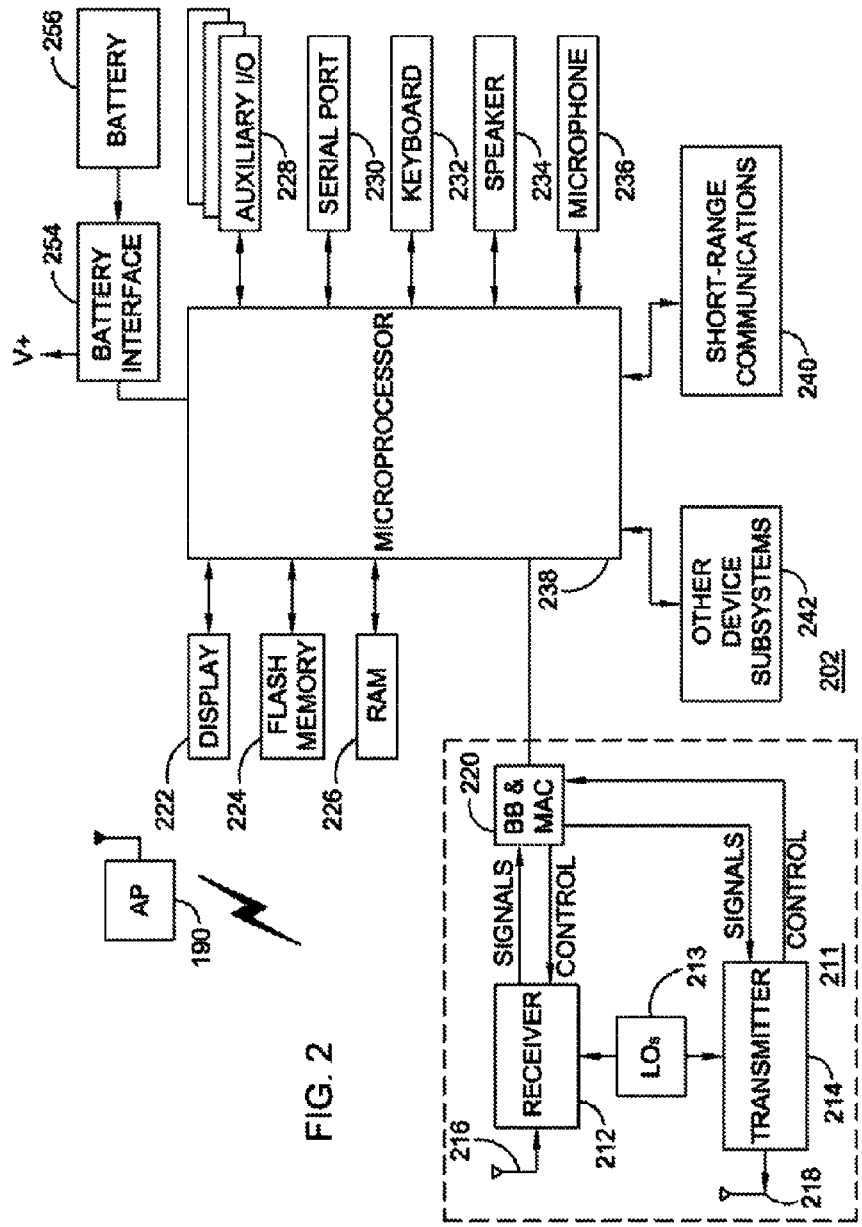
FIG. 2 is a more detailed schematic diagram of a mobile communication device of the WLAN of FIG. 1, namely, a mobile communication device of the preferred embodiment.

Referring now to FIG. 2, electrical components of a typical terminal or mobile communication device 202 (e.g. a mobile station) which operates with wireless APs of communication system 100 of FIG. 1 will be described. Mobile device 202 may be representative of one or more terminals shown and described in relation to FIG. 1. Mobile device 202 is preferably a two-way communication device having at least voice and advanced data communication capabilities, including the capability to communicate with other computer systems. Also preferably, mobile device 202 is a wireless communication device which operates in accordance with an IEEE 802.11 standards. Depending on the functionality provided by mobile device 202, it may be referred to as a data messaging device, a two-way pager, a cellular-type telephone with data messaging capabilities, a wireless Internet appliance, or a data communication device (with or without telephony capabilities).

As shown in FIG. 2, mobile device 202 is adapted to wirelessly communicate with AP 190 which may be a wireless AP of the present application. For communication with AP 190, mobile device 202 utilizes communication subsystem 211. Depending on the type of device, mobile device 202 may also be adapted to wirelessly communicate with other systems such as cellular telecommunication systems. With such configuration, mobile device 202 may be referred to as a "dual mode" mobile device. Although mobile device 202 may have separate and independent subsystems for these purposes, at least some portions or components of these otherwise different subsystems may be shared where possible. Note, however, that the provisioning techniques of the present application do not require that mobile device 202 be any type of dual mode device.

Communication subsystem 211 includes a receiver 212, a transmitter 214, and associated components, such as one or more (preferably embedded or internal) antenna elements 216 and 218, local oscillators (LOs) 213, and a processing module such as a baseband (BB) and media access control (MAC) processing module 220. As will be apparent to those skilled in the field of communications, the particular design of communication subsystem 211 depends on the communication network in which mobile device 202 is intended to operate. In the present application, communication subsystem 211 (including its associated processor/processing components) are operative in accordance with IEEE 802.11 standards.

Mobile device 202 may send and receive communication signals through the network after required network procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in BB/MAC processing module 220. In a similar manner, signals to be transmitted are processed, including modulation and encoding, for example, by BB/MAC processing module 220. These processed signals are input to transmitter 214 for digital-to-analog (D/A) conversion, frequency up conversion, filtering, amplification and transmission through the network via antenna 218. BB/MAC processing module 220 not only professes communication signals, but may also provide for receiver and transmitter control. Note that receiver 212 and transmitter 214 may share one or more antennas through an antenna switch (not shown in FIG. 2), instead of having two separate dedicated antennas 216 and 218 as shown.

Since mobile device 202 may be a portable battery-powered device, it also includes a battery interface 254 for receiving one or more rechargeable batteries 256. Such a battery 256 provides electrical power to most if not all electrical circuitry in mobile device 202, and battery interface 254 provides for a mechanical and electrical connection for it. Battery interface 254 is coupled to a regulator (not shown in FIG. 2) that provides power V+ to all of the circuitry.

Mobile device 202 includes a microprocessor 238 (one type of processor or controller) that controls overall operation of mobile device 202. This control includes the provisioning techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile device 202. A predetermined set of applications that control basic device operations, including at least data and voice communication applications, will normally be installed on mobile device 202 during its manufacture. A preferred application that may be loaded onto mobile device 202 may be a personal information manager (PIM) application having the ability to organize and manage data items relating to user such as, but not limited to, e-mail, calendar events, voice mails, appointments, and task items. Naturally, one or more memory stores are available on mobile device 202 (e.g. a Subscriber Identity Module or SIM 257) to facilitate storage of PIM data items and other information.

The PIM application preferably has the ability to send and receive data items via the wireless network. In a preferred embodiment, PIM data items are seamlessly integrated, synchronized, and updated via the wireless network, with the wireless device user's corresponding data items stored and/or associated with a host computer system thereby creating a mirrored host computer on mobile device 202 with respect to such items. This is especially advantageous where the host computer system is the wireless device user's office computer system. Additional applications may also be loaded onto mobile device 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile device 202 and may provide enhanced on-device functions, communication-related functions, or both. For example, secure communication applications may enable electronic commerce functions and other such financial transactions to be performed using mobile device 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile device 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211. For voice communications, the overall operation of mobile device 202 is substantially similar, except that the received signals would be output to speaker 234 and signals for transmission would be generated by microphone 236. Alternative voice or audio I/O subsystems, such as a voice message recording subsystem, may also be implemented on mobile device 202. Although voice or audio signal output is preferably accomplished primarily through speaker 234, display 222 may also be used to provide an indication of the identity of a calling party, duration of a voice call, or other voice call related information, as some examples:

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile device 202 by providing for information or software downloads to mobile device 202 other than through a wireless communication network. The alternate download path may, for example, be used to load an encryption key onto mobile device 202 through a direct and thus reliable and trusted connection to thereby provide secure device communication. Short-range communications subsystem 240 of FIG. 2 is an additional optional component that provides for communication between mobile device 202 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Although a specific mobile device 202 has just been described, any suitable mobile communication device or terminal may be part of the inventive methods and apparatus which will be described in fuller detail below. Note that many components of mobile device 202 shown and described may not be included (e.g. a full QWERTY keypad may be optional).

Figure 3:
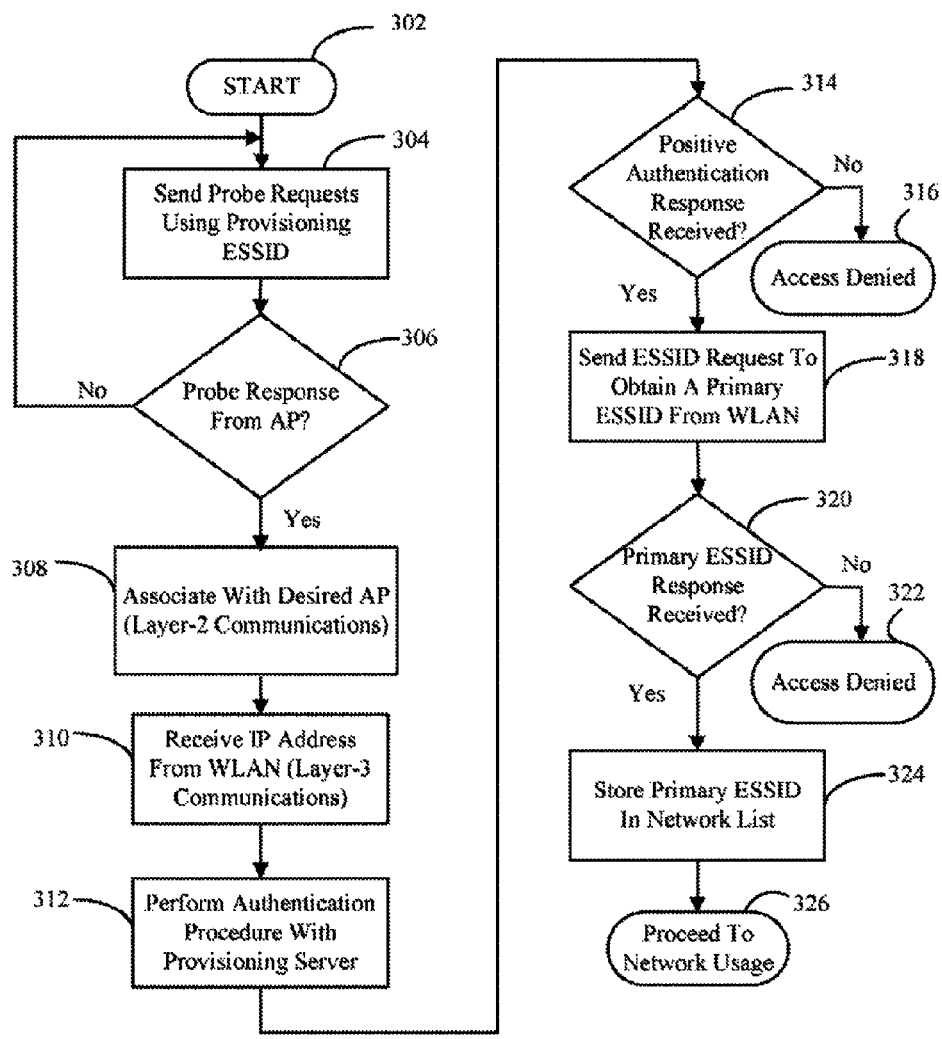
FIG. 3 is a flowchart of a provisioning procedure for a mobile device to obtain a primary extended service set identifier (ESSID) from the WLAN.

FIG. 3 is a flowchart of a method for provisioning a mobile communication device (e.g. one type of wireless terminal) to obtain a primary extended service set identifier (ESSID) from a wireless communication network (e.g. an 802.11-based wireless local area network (WLAN)), taken from the mobile device perspective. The method of FIG. 3 may be performed by the mobile device, and/or be embodied in a computer program product which includes a computer readable medium (e.g. memory) and computer instructions stored in the computer readable medium which are executable by one or more processors. The flowchart of FIG. 3 will be discussed in combination with the components of the communication system of FIG. 1.

Before describing the flowchart of FIG. 3 in detail, it is noted that a primary virtual local area network (ULAN) of the network is adapted to provide one or more services (e.g. VoIP or other communication services) for the mobile device. The WLAN may have one or more primary ESSIDs associated with one or more different VLANs which permit separate and isolated LANs. In order to obtain a primary ESSID to gain access to such services, the mobile device is adapted to perform a wireless network provisioning procedure with the WLAN. Specifically, the mobile device makes use of a provisioning ESSID associated with a provisioning VLAN of the network for the provisioning procedure. The provisioning VLAN is adapted to perform the provisioning procedure with the mobile device, but otherwise allows for limited services in the network for the mobile device (e.g. IP address assignment via DHCP). The provisioning ESSID may be a predetermined fixed ESSID utilized for all mobile devices (i.e. the same fixed ESSID) which is stored in memory. Alternatively, the provisioning ESSID may be unique to each network or mobile device and derived from particular information; this will be described later in relation to FIG. 5. The provisioning ESSID is used initially by the mobile device to associate with an AP of the provisioning VLAN in order to subsequently receive and store a primary ESSID associated with the primary VLAN of the network. The mobile device may then use conventional or other techniques for associating with APs of the primary VLAN using this primary ESSID.

The wireless network provisioning procedure is initiated when the mobile communication device or terminal (terminal 134 of FIG. 1) is located within a coverage area of an access point (AP 132 of FIG. 1) of a private network (private network 104 of FIG. 1) having a WLAN. When terminal 134 is operating, it searches for access points within its coverage range. Beginning at a start block 302 of FIG. 3, terminal 134 sends one or more probe requests to access points (e.g. AP 132 of FIG. 1) using its provisioning ESSID (step 304 of FIG. 3). In this step, terminal 134 may use 802.11 management frames known as probe request frames to send the probe requests. Specifically, terminal 134 sends probe requests on every channel that it supports in an attempt to find all access points in range that match the provisioning ESSID. Terminal 134 sends these requests to AP 132 and any other AP within range of terminal 134 by performing programmed algorithms within BB/MAC processing module 220 and/or microprocessor 238 (FIG. 2).

Next, terminal 134 monitors to receive probe response commands from AP 132 and other APs within the range of terminal 134 (step 306 of FIG. 3). If no APs within the coverage area of terminal 134 are configured to associate with terminal 134 using the provisioning ESSID, no probe responses will be received by terminal 134. In this case, terminal 134 will continue the sending of probe requests using the provisioning ESSID (step 304) and monitoring for probe requests from other APs (step 306). Once a probe response is properly received in step 306, terminal 134 will associate with the AP (e.g. AP 132) of the provisioning VLAN of the network for communications (step 308 of FIG. 3). This step establishes layer-2 communications between terminal 134 and the WLAN. As an alternative to the probe request/response protocol of steps 304 and 306, some APs may regularly broadcast the provisioning ESSIDs in "beacons." In this case, terminal 134 would listen for beacons on all channels that it supports and compare the provisioning ESSID broadcasted by the AP with its own provisioning ESSID and, if there is a match, associate with the AP of the provisioning VLAN. After such association, terminal 134 may be said to be operating in the provisioning VLAN of the network.

After terminal 134 associates with the desired AP 132 in step 308, terminal 134 monitors to receive an Internet Protocol (IP) address over the WLAN (step 310 of FIG. 3). The IP address may be dynamically assigned by the network, for example, with use of an address assignor (e.g. address assignor 120 of FIG. 1) which may be a dynamic host configuration protocol (DHCP) server reachable in the provisioning VLAN. This establishes layer-3 communications between terminal 134 and the network.

Once terminal 134 properly receives the assigned IP address from the DHCP server, terminal 134 performs an authentication procedure with a provisioning server (provisioning server 128 of FIG. 1) of the provisioning VLAN (step 312 of FIG. 3). Terminal 134 may receive a network address of provisioning server 128 from AP 132 so that the authentication procedure with provisioning server 128 may be initiated. In the authentication procedure, terminal 134 sends authentication information (e.g. network password, fingerprint data, or the like) to provisioning server 128. The authentication information may be unique to each WLAN or terminal. Terminal 134 then monitors to receive an authentication response from AP 132 (step 314 of FIG. 3).

The authentication response may indicate to terminal 134 that authentication is denied for accessing the WLAN (e.g. where network password is incorrect). If authentication is denied by the WLAN, association between terminal 134 and AP 132 may be aborted (step 316 of FIG. 3). It may be that terminal 134 has attempted to associate with an AP of a WLAN with which terminal 134 is not authorized and/or not desired to access. From here, terminal 134 may start again at the beginning of the flowchart in attempt to find the proper WLAN for provisioning. Note that each AP is associated with a unique basic service set identifier (BSSID) so that terminal 134 can avoid attempting to perform provisioning authentication more than once with the same AP.

Once terminal 134 has received a positive authentication response from an AP, it is understood that it has gained provisioning access to the VLAN that it desires. In response to the positive authentication from AP 132 at step 314, terminal 134 will send an ESSID request (or, more generally, a provisioning request) to provisioning server 128 to obtain a primary ESSID of the primary VLAN of the network (step 318 of FIG. 3). Terminal 134 then monitors to receive a response from AP 132 (step 320 of FIG. 3). The response may indicate to terminal 134 that the request is denied and, if so, access to the WLAN is denied and association between terminal 134 and AP 132 may be aborted (step 322 of FIG. 3). If a positive response is received at step 320, the primary ESSID (e.g. the enterprise-specific ESSID) of the primary VLAN of the network is wirelessly received from the provisioning VLAN and "programmed" or stored in an internal network list in memory of terminal 134 (step 324 of FIG. 3). During this timeframe, terminal 134 may also receive additional information, such as network access security keys and network server names/addresses for a VoIP server, a SIP server, and an e-mail server, as examples, from provisioning server 128. Once the primary ESSID and any other information are obtained and stored in memory, terminal 134 may proceed to utilize the primary VLAN of the network for services (step 326 of FIG. 3). Thus, for all subsequent communications, terminal 134 may utilize the programmed primary ESSID to associate with the WLAN.

Figure 4:
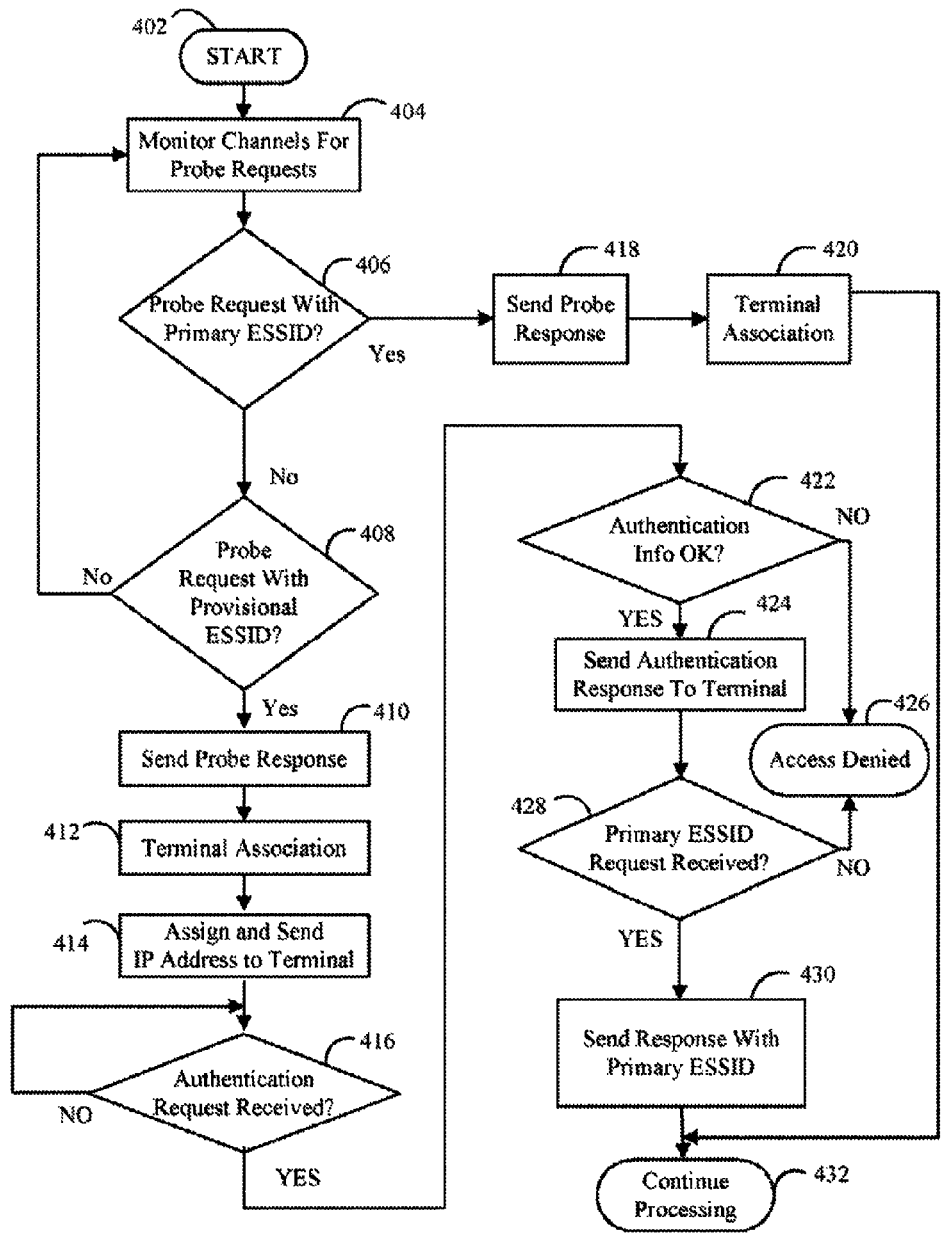
FIG. 4 is a flowchart of a provisioning procedure for the network to provide the mobile device with the primary ESSID.

FIG. 4 is a flowchart for describing an illustrative method of a wireless network provisioning procedure from the perspective of the network. The method of FIG. 4 may be performed by the network (e.g. one or more network servers) and/or the APs of the WLAN, and/or be embodied in a computer program product which includes a computer readable medium (e.g. memory) and computer instructions stored in the storage medium which are executable by one or more processors. Preferably, the network performs the wireless network provisioning procedure upon first receiving a request from an 802.11-based wireless terminal. Subsequently (after provisioning is completed), a conventional method is used for associating with the same 802.11-based wireless terminal.

Prior to discussing FIG. 4 in detail, note that the network has a primary VLAN which is associated with a primary network identifier (i.e. the primary ESSID) and a provisioning VLAN of the network which is associated with a provisioning network identifier (i.e. the provisioning ESSID) and includes a provisioning server. The primary VLAN of the network is adapted to provide one or more services (e.g. VoIP or other communication services) for the mobile device. The WLAN may, in fact, have one or more primary ESSIDs associated with one or more different VLANs of the WLAN which permit separate isolated LANs. On the other hand, the provisioning VLAN is adapted to perform the provisioning procedure with the mobile device, but otherwise allows for limited services in the network for the mobile device (e.g. IP address assignment via DHCP). The provisioning ESSID may be a predetermined fixed ESSID utilized for all mobile devices (i.e. the same fixed ESSID) which is stored in memory (e.g. factory-preset provisioning ESSID). Alternatively, the provisioning ESSID may be unique to each network or mobile device and derived from particular information, which will be described later in relation to FIG. 5. The provisioning ESSID is used initially by the mobile device to associate with an AP of the provisioning VLAN in order to subsequently receive and store the primary ESSID associated with the primary VLAN of the WLAN. The mobile device may then use conventional or other techniques for associating with APs of the primary VLAN using the primary ESSID.

The discussion of FIG. 4 may make reference to both FIGS. 1 and 4 in combination. Beginning at a start block 302 of FIG. 3, an AP of the provisioning VLAN of the network monitors its RF channels for probe requests from mobile devices (step 404 of FIG. 4). In this step, probe requests are received in 802.11 management frames known as probe request frames. Terminals, such as terminal 134, sends probe requests on every channel that it supports in an attempt to find access points in range that have the provisioning ESSID. If a probe request having the primary ESSID of the primary VLAN is received (step 406 of FIG. 4), then the flowchart continues through steps 418 and 420 which is described later. If the probe request does not have the primary ESSID (step 406) but rather includes the provisioning. ESSID (step 408 of FIG. 4), then the AP of the provisioning VLAN sends a probe response to terminal 134 (step 410 of FIG. 4) and, subsequently, terminal 134 associates with the AP (step 412 of FIG. 4). This establishes layer-2 communications between terminal 134 and the WLAN. As an alternative to the probe request/response protocol, some APs may regularly broadcast the provisioning ESSIDs in "beacons." In this case, terminal 134 would compare the provisioning ESSID broadcasted by the AP with its own provisioning ESSID and, if there is a match, associate with the AP of the provisioning VLAN. After such association, terminal 134 may be said to be operating in the primary VLAN of the network.

After terminal 134 associates with the WLAN in step 308, the network assigns and sends an Internet Protocol (IP) address to terminal 134 (step 414 of FIG. 4). The IP address may be dynamically assigned by the network, for example, with use of an address assignor (e.g. address assignor 120 of FIG. 1) which may be a dynamic host configuration protocol (DHCP) server reachable in the provisioning VLAN. This establishes layer-3 communications between terminal 134 and the network. Sometime after the WLAN sends the assigned IP address from the DHCP server in step 414, the provisioning server (provisioning server 128 of FIG. 1) of the provisioning VLAN performs an authentication procedure with terminal 134. Here, authentication request and authentication information is received from terminal (step 416 of FIG. 4). AP 132 may send a network address of provisioning server 128 to terminal 134 so that the authentication procedure with provisioning server 128 may be initiated. The authentication information may be unique to each WLAN or terminal, and may include a network password, fingerprint data, or the like.

The authentication response may indicate to terminal 134 that authentication is denied for that WLAN (e.g. where network password is incorrect) (step 426 of FIG. 4). If authentication is denied by the WLAN, association between terminal 134 and AP 132 may be aborted. It may be that terminal 134 has attempted to associate with an AP of a WLAN with which terminal 134 is not authorized and/or not desired to access. From here, terminal 134 may start again at the beginning of the flowchart in attempt to find the proper WLAN for provisioning. Note that each AP is associated with a unique basic service set identifier (BSSID) so that terminal 134 can avoid attempting to perform provisioning authentication more than once with the same AP.

If the authentication information is tested positive at step 422, then it is understood that terminal 134 has gained provisioning access to the AP/WLAN that it desires. After a positive authentication from AP 132 at step 424, the provisioning VLAN receives an ESSID request (or, more generally, a provisioning request) from terminal 134 to receive a primary ESSID of the primary VLAN of the network (step 428 of FIG. 4). If not, access to the WLAN is denied (step 424 of FIG. 4) and association between terminal 134 and AP 132 may be aborted. After receiving the ESSID request in step 428, the provisioning VLAN causes the primary ESSID (e.g. the enterprise-specific ESSID) of the primary VLAN of the network to be wirelessly sent from AP 132 to terminal 134 (step 430 of FIG. 4). This primary ESSID is "programmed" or stored in an internal network list in memory of terminal 134. During this timeframe, the WLAN may also send additional information, such as network access security keys and network server names/addresses for a VoIP server, a SIP server, and an e-mail server, as examples. Once the primary ESSID and any other information are sent by the provisioning VLAN and stored in memory of terminal 134, the primary VLAN of the network may provide services to terminal 134 where it utilizes the primary ESSID for association with APs of the WLAN (step 432 of FIG. 4). Thus, for all subsequent communications, terminal 134 may utilize the programmed primary ESSID to associate with the WLAN.

As described earlier above, the provisioning ESSID may be a predetermined fixed ESSID utilized for all mobile devices (i.e. the same fixed ESSID) which is stored in memory (e.g. a factory-preset provisioning ESSID for all mobile devices). Alternatively, the provisioning ESSID may be unique to each network or mobile device and derived from particular information. This latter technique is now described in relation to FIG. 5.

Figure 5:
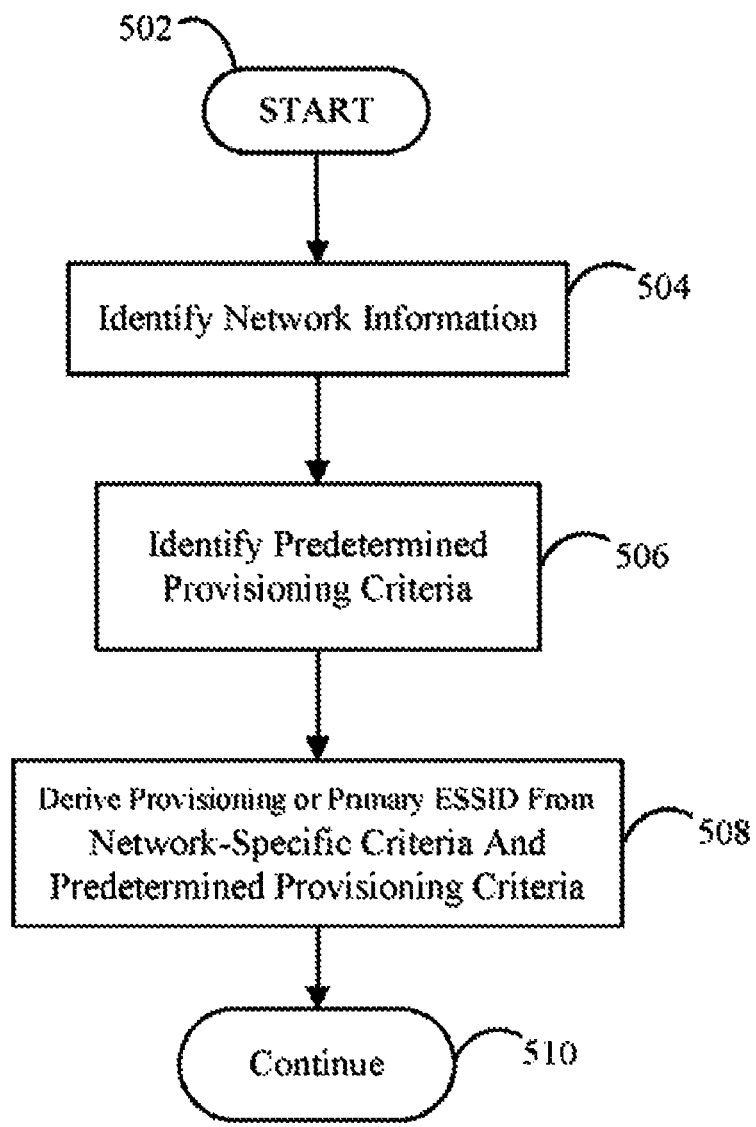
FIG. 5 is a flowchart of a particular technique for deriving a provisioning ESSID for use in the provisioning procedures of the present application.

FIG. 5 is a flowchart which describes a method for use in deriving the provisioning ESSID for use in the provisioning procedures described in relation to FIGS. 3 and 4. The method of FIG. 5 may be performed by both the mobile device and the network device (e.g. a provisioning server and/or AP in the WLAN), and/or be embodied in a computer program product which includes a computer readable medium (e.g. memory) and computer instructions stored in the computer readable medium which are executable by one or more processors.

Beginning at a start block 502 of FIG. 5, network information associated with the network or WLAN is identified by the device (step 504 of FIG. 5). In the present embodiment, these network-specific criteria are all or part of a domain name of the private network of which the WLAN is a part. For example, the network-specific criteria may be "company123" based on the domain name "www.company123.com" associated with the private network of the WLAN. In the network device, the domain name may be easily obtained from the DHCP server or the like. In the mobile device, this information may be obtained from an application program of the mobile device (e.g. an e-mail application program) or as user input information received through the user interface of the mobile device. The latter approach may be preferable, especially in the case where the mobile device already requires the end user to use the user interface to enter in one or more e-mail addresses (john.doe@company123.com) of e-mail accounts for sending and receiving e-mail messages with the mobile device. In this case, the mobile device must extract all or part of the domain name from the e-mail address. As another example, the network-specific criteria may be all or part of a company name (acme_company) which owns the private network of which the WLAN is a part. Other types of criteria may be utilized, as will be described later below.

Next, predetermined provisioning criteria are identified at the device (step 506 of FIG. 5). Preferably, the predetermined provisioning criteria is the same for all mobile devices and all networks, and established during the design or manufacturing and stored in memory of the devices. Thus, the predetermined provisioning criteria is known in advance and stored in memory of the network and the mobile devices. In the present embodiment, the predetermined provisioning criteria are alphanumeric characters of a fixed alphanumeric string which is the same for all mobile devices and networks. For example, the predetermined provisioning criteria may be a fixed alphanumeric string such as "provdevice" or "prvdev456". Other types of criteria may be utilized, as will be described later below.

Next, the provisioning ESSID for use in the provisioning procedure is derived based on both the network-specific criteria and predetermined provisioning criteria (step 508 of FIG. 5). In general, the resulting provisioning ESSID should be unique for each given unique network-specific criteria. In the mobile device, the provisioning ESSID is stored in a network list in memory. In the network, this derived provisioning ESSID is associated and utilized with APs of the provisioning ULAN of the network. The provisioning ESSID is utilized by both the mobile device and network components in the network in the provisioning procedures described above in relation to FIGS. 3-4.

In the derivation step 506 of FIG. 5, a predetermined algorithm is used to derive the provisioning ESSID from both the predetermined provisioning criteria and the network-specific criteria. In one example, the derivation of the provisioning ESSID is performed with use of a predetermined algorithm that is an "appending" algorithm. For example, if the network-specific criteria is "company123" and the predetermined provisioning criteria is "provdevice", then the provisioning ESSID may be derived as "provdevice_company123" using the appending algorithm. Here, the alphanumeric characters of both the predetermined provisioning criteria and the network criteria form part of the derived provisioning ESSID. A truncation step may be performed in any of such techniques, so that the provisioning ESSID may be derived as "provdevice_compan", for example. With use of such approaches, only one set of alphanumeric characters (i.e. the predetermined provisioning criteria or the network-specific criteria) or a part thereof need form the resulting provisioning ESSID. As another example, the derivation of the provisioning ESSID is performed with use of a "character interleaving" algorithm so that, using the above-example criteria, the provisioning ESSID may be derived as "cpormopvadneyv1i2c3e" or truncated form as "cpormopvad".

In even another variation, the predetermined provisioning criteria may additionally or alternatively specify the predetermined algorithm by which network-specific criteria are manipulated into the provisioning ESSID. For example, the network-specific criteria may be "company123" and the predetermined provisioning criteria may be a "backwards text" algorithm so that the derived provisioning ESSID is "321ynapmoc". In the above example, the predetermined provisioning criteria only specify the algorithm and no other information. A truncation step may further form part of this predetermined algorithm. The reverse approach may also be utilized, where the network-specific criteria additionally or alternatively specifies the predetermined algorithm by which the predetermined criteria is derived into the provisioning ESSID. As apparent, there are many possibilities and variations for deriving the provisioning ESSID.

More broadly, it is noted that the method of deriving an ESSID described above in relation to FIG. 5 may be employed to derive a primary ESSID for the network without regard to any provisioning ESSID or provisioning procedure. Such a method for use in producing an ESSID for use in communications with a WLAN may include the steps of receiving network criteria associated with the network; deriving the ESSID based on both predetermined criteria and the network criteria associated with the network; storing the ESSID in memory; and associating with a wireless access point of the WLAN of the network with use of the ESSID. The ESSID may be a provisioning ESSID for a provisioning procedure of the network, or a primary ESSID of the WLAN for accessing services of the network.

Final Comments. As described herein, methods and apparatus for use in provisioning mobile communication devices in WLANs have been detailed. A mobile communication device associates with a wireless access point of a provisioning VLAN of the network with use of a provisioning network identifier. After associating with the wireless access point, a primary network identifier ("primary ESSID") associated with a primary VLAN of the network is received from the WLAN and "programmed" or stored in memory of the mobile device after an authentication procedure. For subsequent communications with the WLAN, the mobile device associates with a wireless access point of the primary VLAN of the network with use of the primary network identifier.

A mobile communication device of the present application may include one or more processors; a wireless transceiver coupled to the one or more processors; and memory coupled to the one or more processors. The one or more processors are operative to associate, with use of the wireless transceiver, with a wireless access point of the wireless network using a provisioning network identifier; after associating with the wireless access point of the wireless network, receive a primary network identifier from the wireless network through the wireless transceiver; storing the primary network identifier in the memory; and for subsequent communications with the wireless network: associate, with use of the wireless transceiver, with a wireless access point of the wireless network using the primary network identifier.

From the network perspective, a method for use in provisioning a mobile communication device may involve the steps of allowing a mobile communication device to associate with a wireless access point of the WLAN with use of a provisioning network identifier; after associating with the wireless access point of the WLAN, causing a primary network identifier to be sent from the WLAN to the mobile communication device; and for subsequent communications with the WLAN: allowing the mobile communication device to associate with a wireless access point of the WLAN with use of the primary network identifier. The WLAN of the present application may have a primary virtual local area network (VLAN) which is associated with a primary network identifier; a provisioning VLAN which is associated with a provisioning network identifier; a provisioning server of the provisioning VLAN; and at least one wireless access point. The at least one wireless access point is operative to allow a mobile communication device to associate with it with use of the provisioning network identifier; after the mobile communication device associates with the at least one wireless access point, cause the primary network identifier to be transmitted from the WLAN to the mobile communication device; and for subsequent communications with the mobile communication device: allow the mobile communication device to associate with the at least one wireless access point with use of the primary network identifier.

Finally, a method of producing an ESSID for use in communications with a WLAN may include the steps of receiving network criteria associated with the network; deriving the ESSID based on both predetermined criteria and the network criteria associated with the network; storing the ESSID in memory; and associating with a wireless access point of the WLAN with use of the ESSID. This derived ESSID may be a provisioning ESSID for a provisioning procedure of the WLAN, or a primary ESSID of the WLAN for accessing services of the network.

The above-described embodiments of the present application are intended to be examples only. Those of skill in the art may effect alterations, modifications and variations to the particular embodiments without departing from the scope of the application. For example, the WLANs may be based on WiMAX technology or other suitable wireless technologies. The invention described herein in the recited claims intends to cover and embrace all suitable changes in technology.

What is claimed is:

1. A method in a mobile communication device for use in communicating in a wireless network, the wireless network having a primary network which provides one or more communication services and a provisioning network which provides a provisioning service but disallows the one or more communication services, the method comprising:

sending, to an access point of the wireless network, a request for associating with the access point for accessing and operating in the provisioning network, the request including a first set service identifier (SSID);
while being associated with the access point using the first SSID, sending authentication information to the wireless network in an authentication procedure;
if the authentication procedure is successful, then:
receiving, via the access point, a second SSID in a provisioning procedure with the provisioning network;
programming the second SSID in a network list maintained in memory of the mobile device; and
for each one of a plurality of subsequent associations with an access point of the wireless network: sending a request for associating with the access point for accessing and operating in the primary network, the request including the second SSID instead of the first SSID.

2. The method of claim 1, wherein the mobile communication device is operative in accordance with IEEE 801.11.

3. The method of claim 1, wherein the authentication procedure comprises a login procedure with the wireless network and the authentication information comprises a password.

4. The method of claim 1, wherein the first SSID comprises a first Extended SSID (ESSID) and the second SSID comprises a second ESSID.

5. The method of claim 1, wherein the act of associating with the wireless network comprises the further acts of
causing a probe request with the first SSID to be sent to the wireless access point of the wireless network; and
monitoring to receive a probe response from the wireless access point in response to the probe request.

6. The method of claim 1, further comprising:
if the authentication procedure is unsuccessful, then failing to receive the second SSID.

7. The method of claim 1, which is embodied in a computer readable medium as computer instructions stored therein, the computer instructions being executable by one or more processors of the mobile communication device.

8. A mobile communication device configured to operate in a wireless network, the wireless network having a primary network configured to provide one or more communication services and a provisioning network configured to provide a provisioning service but disallow the one or more communication services, the mobile communication device comprising:
one or more processors;
a wireless transceiver coupled to the one or more processors;
memory coupled to the one or more processors;
the one or more processors being operative to:
sending, via the wireless transceiver, to an access point of the wireless network, a request for associating with the access point for accessing and operating in the provisioning network, the request including a first set service identifier (SSID);
while being associated with the access point using the first SSID, send via the wireless transceiver authentication information to the wireless network in an authentication procedure;
if the authentication procedure is successful, then:
receive, via the access point, a second SSID in a provisioning procedure with the provisioning network;
program the second SSID in a network list maintained in the memory; and
for each one of a plurality of subsequent associations with an access point of the wireless network: sending, via the wireless transceiver to the access point, a request for associating with the access point for accessing and operating in the primary network, the request including the second SSID instead of the first SSID.

9. The mobile communication device of claim 8, which is operative in accordance with IEEE 802.11.

10. The mobile communication device of claim 8, wherein the authentication procedure comprises a login procedure with the wireless network and the authentication information comprises a password.

11. The mobile communication device of claim 8, wherein the first SSID comprises a first Extended SSID (ESSID) and the second SSID comprises a second ESSID.

12. The mobile communication device of claim 8, wherein the one or more processors are configured to associate with the wireless network by:
causing a probe request with the first SSID to be sent to the wireless access point of the wireless network; and
monitoring to receive a probe response from the wireless access point in response to the probe request.

13. The mobile communication device of claim 8, wherein the one or more processors are configured to:
if the authentication procedure is unsuccessful, then fail to receive the second SSID.

14. A method in a wireless network for use in providing communications with a mobile communication device, the wireless network having a primary network which provides one or more communication services and a provisioning network which provides a provisioning service but disallows the one or more communication services, the method comprising:
receiving, from the mobile communication device, a request for associating with an access point of the wireless network for mobile device access and operation in the provisioning network, the request including a first set service identifier (SSID);
while the mobile device is associated with the access point using the first SSID, receiving authentication information from the mobile communication device in an authentication procedure;
if the authentication procedure is successful, then sending to the mobile communication device a second SSID in a provisioning procedure, for programming the second SSID in the mobile communication device; and
receiving, from the mobile communication device, a request for associating with an access point of the wireless network for mobile device access and operation in the primary network, the request including the second SSID instead of the first SSID.

15. The method of claim 14, wherein the wireless network comprises a wireless local area network (WLAN) and the wireless network is operative in accordance with IEEE 802.11.

16. The method of claim 14, wherein the authentication procedure comprises a login procedure with the wireless network and the authentication information comprises a password.

17. The method of claim 14, wherein the first SSID comprises a first Extended SSID (ESSID) and the second SSID comprises a second ESSID.

18. The method of claim 14, which is embodied in a computer readable medium as computer instructions stored therein, the computer instructions being executable by one or more processors of the wireless network.

19. A wireless communication network having a primary network which provides one or more communication services and a provisioning network which provides a provisioning service but disallows the one or more communication services, the wireless communication network comprising:
at least one access point;
at least one server;
the at least one access point being configured to receive, from a mobile communication device, a request for associating with the access point, for mobile device access and operation in the provisioning network, the request including a first set service identifier (SSID);
the at least one server being configured to receive authentication information from the mobile communication device in an authentication procedure while the mobile device is associated with the access point using the first SSID;
the at least one server being configured to, if the authentication procedure is successful, send to the mobile communication device a second SSID in a provisioning procedure; and
the at least one access point being further configured to receive, from the mobile communication device, a request for associating with the access point, for mobile device access and operation in the primary network, the request including the second SSID instead of the first SSID.

20. The wireless communication network of claim 19, comprising a wireless local area network (WLAN) operative in accordance with IEEE 802.11.

* * * * *